(12) United States Patent
Chandler

(10) Patent No.: US 12,729,648 B2
(45) Date of Patent: Sep. 8, 2026

(54) AXIAL FLOW ANGLED CONDENSER ARRANGEMENT FOR AN AIRCRAFT PROPULSION SYSTEM

(71) Applicant: RTX CORPORATION, Farmington, CT (US)

(72) Inventor: Jesse M. Chandler, S. Windsor, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/678,638

(22) Filed: May 30, 2024

(65) Prior Publication Data

US 2025/0369393 A1 Dec. 4, 2025

(51) Int. Cl.
*F02C 7/141* (2006.01)
*F02C 3/30* (2006.01)

(52) U.S. Cl.
CPC ................ *F02C 7/141* (2013.01); *F02C 3/30* (2013.01); *F05D 2220/323* (2013.01); *F05D 2260/213* (2013.01); *F05D 2260/606* (2013.01)

(58) Field of Classification Search
CPC .... F02C 3/305; F02C 3/22; F02C 3/30; F02C 7/141; F02C 6/00; F02C 6/18; F02C 7/18; F02C 7/185; F02C 7/22; F05D 2220/323; F05D 2260/212; F01D 25/32
See application file for complete search history.

(56) References Cited

U.S. PATENT DOCUMENTS 10,584,635 B2 3/2020 Armstrong et al.
10,934,936 B2 3/2021 Snyder et al.
11,603,798 B1 * 3/2023 Terwilliger ............... F02C 7/18
11,920,515 B2 * 3/2024 Alahyari ................. F01D 25/30
12,012,892 B1 * 6/2024 Alahyari ................. F02C 7/143
12,031,485 B1 * 7/2024 Terwilliger ............. F02C 3/305
12,037,945 B1 * 7/2024 Sobanski ................ F01D 25/32
12,077,310 B1 * 9/2024 Smith ........................ F02C 7/18
12,092,022 B2 * 9/2024 Sobanski .................. F02C 3/30
12,129,774 B2 * 10/2024 Staubach .................. F02K 3/06
12,134,984 B1 * 11/2024 Evans ................... F02C 7/1435
12,203,392 B2 * 1/2025 Sobanski .................. F02C 7/16
12,221,905 B1 * 2/2025 Sibbach .................. F01K 23/10
(Continued)

FOREIGN PATENT DOCUMENTS

CN 118623658 A * 9/2024 ............... F22G 1/00
DE 102022114214 A1 * 12/2023 ............. F02C 3/305
(Continued)

OTHER PUBLICATIONS

Partial European Search Report for European Application No. 25180012.4 mailed Mar. 4, 2026.

*Primary Examiner* — Craig Kim

(74) *Attorney, Agent, or Firm* — Carlson, Gaskey & Olds, P.C.

(57) ABSTRACT

An aircraft propulsion system includes a plurality of condenser pairs where water is condensed from the exhaust gas flow received through a corresponding one of the plurality of exhaust ducts. Each of the condenser pairs are angled relative to each other and the corresponding one of the plurality of exhaust ducts and each condenser of the plurality of condenser pairs comprises an inward facing side and an outward facing side through which a cooling air flow is communicated for cooling the exhaust gas flow.

13 Claims, 5 Drawing Sheets

(56) References Cited

U.S. PATENT DOCUMENTS

| | | | | |
|---|---|---|---|---|
| 12,228,071 | B1 * | 2/2025 | Alahyari | F02C 3/30 |
| 2023/0286661 | A1 | 9/2023 | Klingels | |
| 2023/0374938 | A1 * | 11/2023 | Staubach | F02C 3/22 |
| 2023/0407768 | A1 | 12/2023 | Staubach | |
| 2024/0263578 | A1 * | 8/2024 | Sobanski | F02C 3/30 |
| 2024/0360784 | A1 * | 10/2024 | Sobanski | F02C 3/04 |
| 2024/0369014 | A1 * | 11/2024 | Hanlon | F02C 9/18 |
| 2025/0075655 | A1 * | 3/2025 | Terwilliger | F02C 7/141 |
| 2025/0075674 | A1 * | 3/2025 | Schimmels | F01D 25/30 |

FOREIGN PATENT DOCUMENTS

| | | | | |
|---|---|---|---|---|
| DE | 102022115587 | A1 * | 12/2023 | F02K 3/04 |
| EP | 4279720 | A1 * | 11/2023 | F02C 3/22 |
| EP | 4279721 | A1 | 11/2023 | |
| EP | 4481172 | A1 * | 12/2024 | F02C 7/18 |
| WO | 2023237152 | A1 | 12/2023 | |
| WO | 2023246980 | A1 | 12/2023 | |

* cited by examiner

TO
WATER
SEPARATOR
52
108
118
66
114
112
106
64
42
A 65
98
66
114
102
48
104
116
120
96
110
104
102
48
100
66
98

AXIAL FLOW ANGLED CONDENSER ARRANGEMENT FOR AN AIRCRAFT PROPULSION SYSTEM

TECHNICAL FIELD

The present disclosure relates generally to a condenser arrangement for water recovery system of an aircraft propulsion system.

BACKGROUND

An aircraft propulsion system typically includes a gas turbine engine with a fan section, a compressor section, a combustor section, and a turbine section. Air entering the compressor section is compressed and delivered into the combustion section where it is mixed with fuel and ignited to generate a high-energy exhaust gas flow. Energy in the high energy exhaust flow is recovered as it is expanded through a turbine section. A large amount of energy in the form of heat is simply exhausted from the turbine section to the atmosphere. Steam injection can provide improved propulsive efficiencies by increasing mass flow without a corresponding increase in work. Water recovered from the exhaust gas flow may be transformed into steam using thermal energy from the exhaust gas flow. Water recovery is performed with condensing heat exchangers arranged relative to the engine that direct water to an evaporative heat exchanger.

Turbine engine manufacturers continue to seek further improvements to engine performance including improvements to thermal, transfer and propulsive efficiencies.

SUMMARY

An aircraft propulsion system according to an exemplary embodiment of this disclosure, includes, among other possible things, a core engine comprising a compressor, combustor, and turbine section. An inlet airflow is compressed communicated to the combustor, mixed with fuel, and ignited to generate an exhaust gas flow that is expanded through the turbine section. A propulsor is driven about a propulsor axis by the core engine, a plurality of exhaust ducts, and a plurality of condenser pairs where water is condensed from the exhaust gas flow received through a corresponding one of the plurality of exhaust ducts, Each of the condenser pairs are angled relative to each other and the corresponding one of the plurality of exhaust ducts and each condenser of the plurality of condenser pairs comprises an inward facing side and an outward facing side through which a cooling air flow is communicated for cooling the exhaust gas flow.

In a further embodiment of the foregoing aircraft propulsion system, the system includes a plurality of water separators where water from corresponding ones of the plurality of condenser pairs is separated from the exhaust gas flow.

In a further embodiment of any of the foregoing aircraft propulsion systems, the system includes an evaporator where water extracted from the exhaust gas flow is heated to generate a steam flow for injection into the core engine.

In a further embodiment of any of the foregoing aircraft propulsion systems, the system includes a plurality of evaporators disposed within a corresponding one of the plurality of exhaust ducts.

In a further embodiment of any of the foregoing aircraft propulsion systems, the system includes a plurality of superheaters disposed within a corresponding one of the plurality of exhaust ducts.

In a further embodiment of any of the foregoing aircraft propulsion systems, the system includes a cooling air duct assembly where a portion of inlet airflow is communicated to each of the plurality of condenser pairs and the aft side of each of the plurality of condenser pairs is closed to force the cooling airflow through each of the plurality of condenser pairs.

In a further embodiment of any of the foregoing aircraft propulsion systems, the system includes a bypass duct where a portion of the inlet airflow is bypassed around the plurality of condenser pairs and the core engine.

In a further embodiment of any of the foregoing aircraft propulsion systems, the turbine section of the core engine is engine forward of the combustor and the compressor section and an inlet duct assembly communicates a portion of the inlet airflow to an inlet that is disposed aft of the compressor section.

In a further embodiment of any of the foregoing aircraft propulsion systems, the system includes a power turbine coupled to drive the propulsor, the power turbine disposed engine forward of the core engine.

In a further embodiment of any of the foregoing aircraft propulsion systems, the system includes a nacelle assembly disposed about the propulsor and the core engine. The plurality of condenser pairs is supported within the nacelle.

In a further embodiment of any of the foregoing aircraft propulsion systems, the system includes an intercooling system where a portion of water recovered from the exhaust gas flow is injected into the compressor for cooling a core flow.

A water recovery system for an aircraft propulsion system according to an exemplary embodiment of this disclosure includes, among other possible things, a plurality of condenser pairs where water is condensed from an exhaust gas flow received through a corresponding one of a plurality of exhaust ducts. Each of the condenser pairs are angled relative to each other and the corresponding one of the plurality of exhaust ducts and a cooling airflow is communicated through each condenser into a space between corresponding ones of the condenser pairs and a plurality of water separators where water from corresponding ones of the plurality of condenser pairs is separated from the exhaust gas flow.

In a further embodiment of the foregoing water recovery system, the system includes an evaporator where water from the plurality of water separators is transformed into a steam flow and communicated to a combustor. The evaporator comprises a plurality of evaporators disposed within a corresponding one of the plurality of exhaust ducts.

In a further embodiment of any of the foregoing water recovery systems, the system includes a plurality of superheaters where steam flow is further heated.

In a further embodiment of any of the foregoing water recovery systems, each condenser of the plurality of condenser pairs comprises an outward facing side in flow communication with a cooling air flow and an inward facing side through which the cooling airflow is exhausted.

In a further embodiment of any of the foregoing water recovery systems, the inward facing side of each of the plurality of condenser pairs face each other.

In a further embodiment of any of the foregoing water recovery systems, the system includes a nacelle. The plurality of condenser pairs and the plurality of water separators are supported in the nacelle. The nacelle includes a cooling air duct where a portion of inlet airflow is communicated to each of the series of condensers for providing a cooling flow through each of the series of condensers.

In a further embodiment of any of the foregoing water recovery systems, the nacelle comprises a bypass duct where a portion of an inlet airflow is bypassed around the plurality of condenser pairs and a core engine.

A method of operating an aircraft propulsion system according to an exemplary embodiment of this disclosure includes, among other possible things, generating an exhaust gas flow with a core engine comprising a compressor, combustor, and turbine section, coupling a propulsor to a power turbine configured to be driven by expansion of the exhaust gas flow about a propulsor axis by the core engine, and condensing water in a plurality of condensers pairs. Each of the condenser pairs are angled relative to each other and a corresponding one of a plurality of exhaust ducts and each condenser of the plurality of condenser pairs comprises an outward facing side in flow communication with a cooling air flow and an inward facing side through which the cooling airflow is exhausted, and separating water from the exhaust gas flow in one of a plurality of water separators.

In a further embodiment of the foregoing method, the method includes generating a steam flow from water extracted from the exhaust gas flow in an evaporator that exhausts an exhaust gas flow into a corresponding one of the plurality of exhaust ducts.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
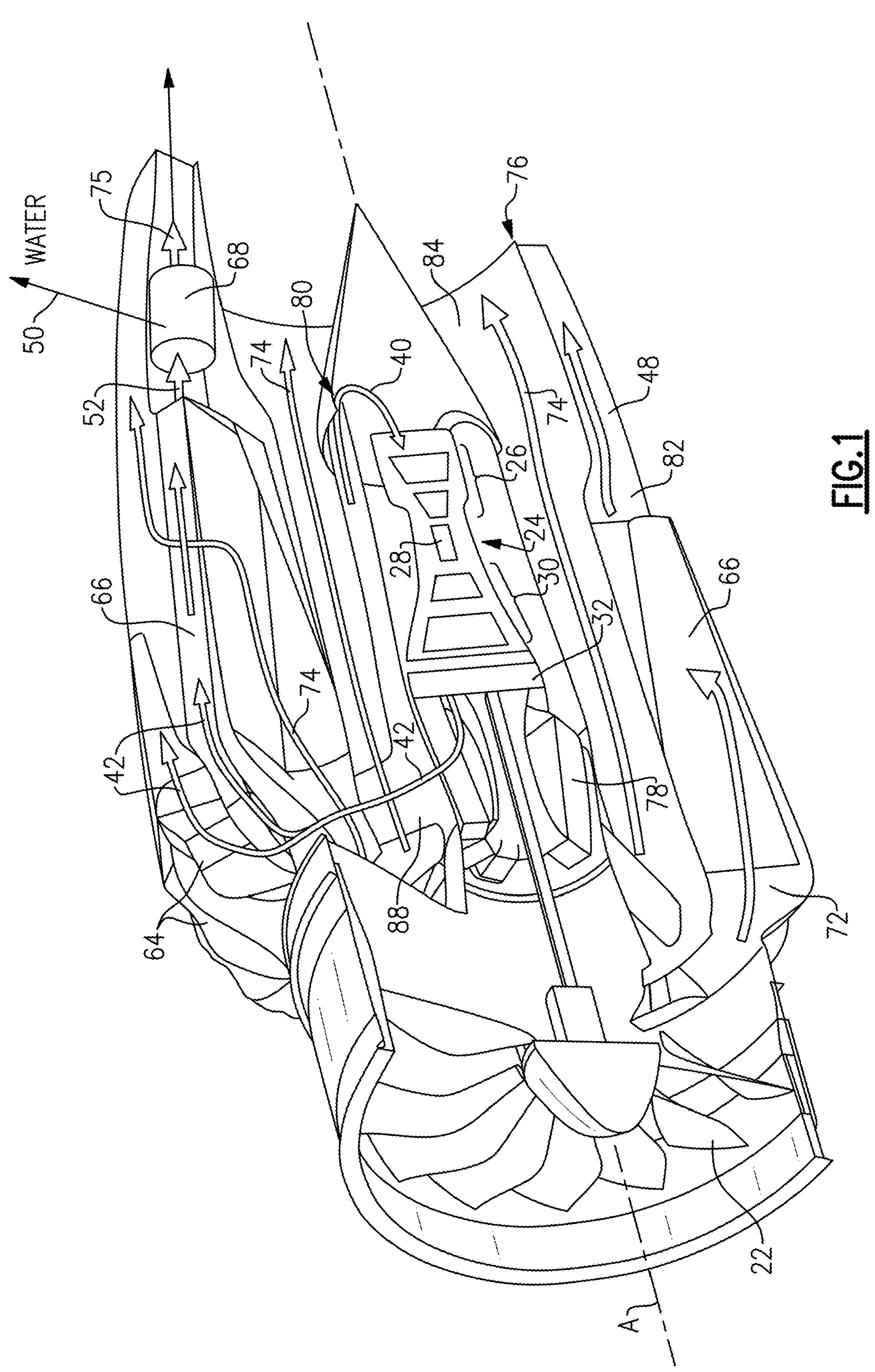
FIG. 1 is a schematic view of an example aircraft propulsion system.
Figure 2:
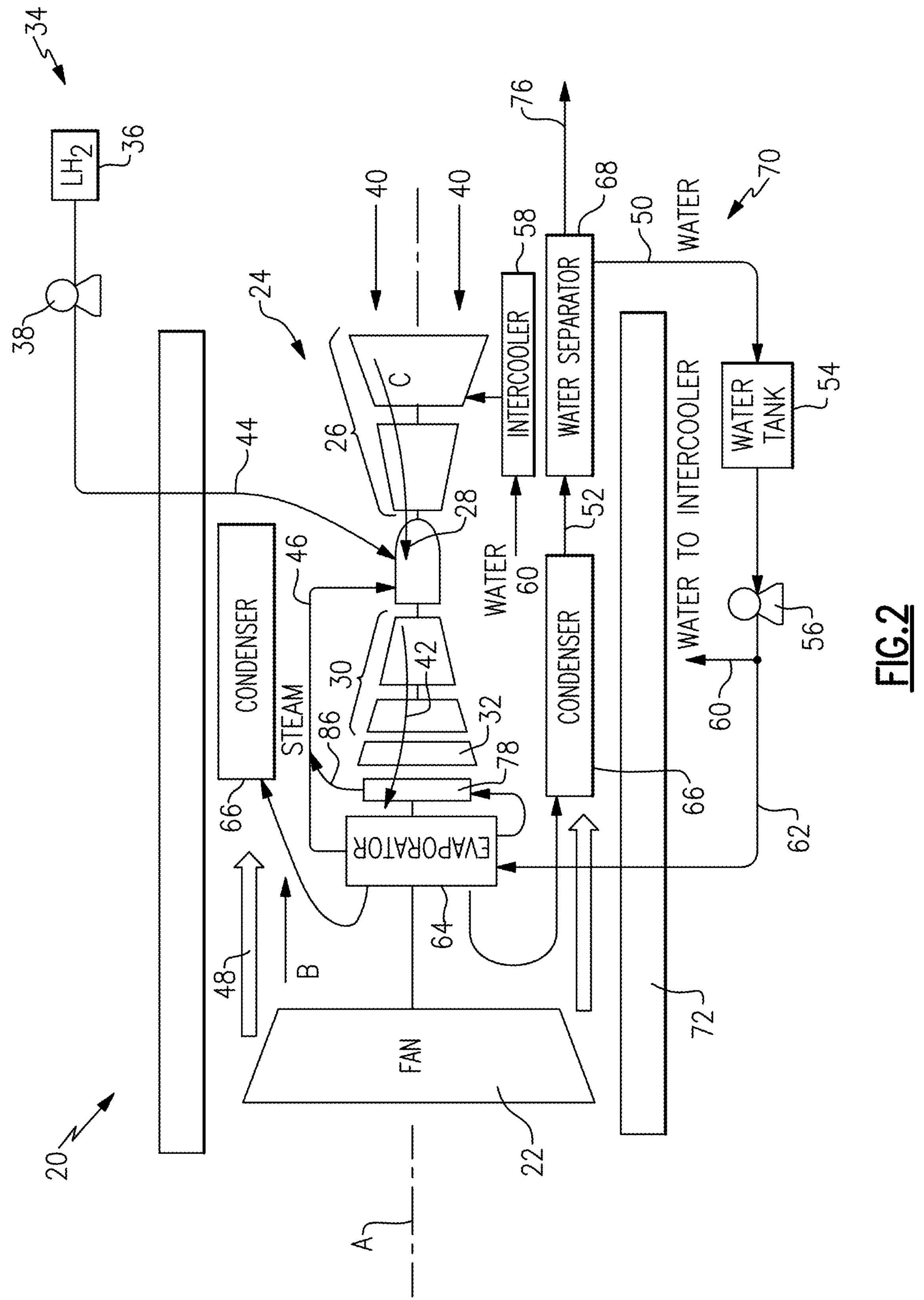
FIG. 2 is a simplified schematic view of the example aircraft propulsion system.

FIGS. 1 and 2 schematically illustrate an aircraft propulsion system 20 including a water recovery system 70 that generates a steam flow 46 with water recovered from an exhaust gas flow 42. The water recovery system 70 condenses water from the gas flow 42 in a series of condensers 66 that are arranged in pairs spaced apart circumferentially about an engine longitudinal axis A. Exhaust gas 42 flows through the condensers 66 in an axial direction. Cooling air flow 48 is communicated to outward facing sides of the condensers 66 and flows circumferentially through to inward facing sides. Cooling flow exhausted from the condensers is turned axially and directed through a nozzle 76. A separator 68 separates water from a flow 52 exhausted from the condensers 66 and directs the water to an evaporator 64 to generate a steam flow used to improve propulsive efficiency.

The evaporators 64 and condensers 66 are heat exchangers that are configured to transfer thermal energy. In the evaporators 64, thermal energy from the exhaust gas flow 42 is utilized to vaporize water to generate the steam flow 46. In the condensers 66, a cooling air flow 48 is utilized to cool and condense liquid from the exhaust gas flow 42. Evaporation and condensing functions may require large areas of thermal communication. The disclosed condenser pairs 65 (illustrated in FIG. 3) and evaporators 64 provides the large areas for thermal communication in the limited space for the example propulsion system.

The example propulsion system 20 includes a propulsive fan 22 and a reverse core engine 24. The example core engine 24 includes a compressor section 26, a combustor section 28 and the turbine section 30 disposed along the longitudinal axis A. The turbine section 30 is disposed engine forward of the combustor 28 and the compressor section 26. A power turbine 32 is arranged forward of the turbine section 30 and is driven by the exhaust gas flow 42 from the turbine section 30. The power turbine 32 is coupled to the drive the fan 22 and is rotatable independent of structures in the core engine 24. The power turbine 32 is not mechanically coupled to the core engine 24.

The fan 22 drives the bypass airflow 48 along a bypass flow path B, while the compressor section 26 draws an inlet flow 40 through an inlet duct 80 and along a core flow path C. The inlet flow 40 is turned 180 degrees into the compressor section 26 by the inlet duct 80. The inlet flow 40 is compressed and communicated to the combustor section 28 where the compressed inlet flow 40 is mixed with a fuel flow 44 and ignited to generate an exhaust gas flow 42. The exhaust gas flow 42 expands through the turbine section 30 where energy is extracted and utilized to drive compressor section 26. The exhaust gas flow 42 further expands through the power turbine 32 to drive the fan 22.

In addition to the fuel 44, a steam flow 46 is introduced into the combustor 28. The steam flow 46 may be injected at the combustor 28 or a location upstream of the combustor for communication into the combustor 28. Performance is improved with the injection of the steam flow by increasing turbine mass flow and power output without additional work required by the compressor section 26.

A fuel system 34 includes at least a fuel tank 36 and a fuel pump 38 to provide the fuel flow 44 to the combustor 28. The example fuel system 34 is configured to provide a hydrogen based fuel such as a liquid hydrogen ($LH_2$). Although hydrogen is disclosed by way of example, other non-carbon based fuels could be utilized and are within the contemplation of this disclosure. Moreover, the disclosed features may also be beneficial in an engine configured to operate with traditional carbon fuels and/or biofuels, such as sustainable aviation fuel.

The example propulsion system 20 may further include an intercooler 58 for injecting an intercooling water flow 60 into the compressor section 26 to reduce a temperature of the inlet airflow 40 and increase mass flow. Reduced temperatures and increased mass flow provided by injection of water increases compressor efficiency.

Although an example engine architecture is disclosed by way of example, other turbine engine architectures are within the contemplation and scope of this disclosure. For example, the core engine 24 is disclosed by way of example as disposed along the longitudinal axis A, however different orientations of the core engine 24 may be used and are within the contemplation of this disclosure. Moreover, although the disclosed non-limiting embodiment depicts a turbofan turbine engine, it should be understood that the concepts described herein are not limited to use with turbofans as the teachings may be applied to other types of turbine engines. Additionally, the features of this disclosure may be applied to other engine configurations utilized to generate shaft power.

The water recovery system 70 includes a series of the condensers 66, water separators 68, and a water storage tank 54. The water tank 54 provides for the accumulation of a volume of water required for production of sufficient amounts of steam. Water recovered from the exhaust gas flow is driven by pump 56 to provide a pressurized water flow 62 to one of a plurality of evaporators 64. A water flow 60 may also be separately supplied to an intercooler 58 for cooling the core flow through the compressor section 26.

The example condensers 66 are arranged within the nacelle 72 circumscribing the core engine 24. The nacelle 72 includes a bypass duct 84 for directing a bypass flow 74. A cooling air duct 82 directs a cooling bypass airflow 48 to the condenser pairs 65. An inlet duct 80 turns the inlet airflow 40 into the core engine 24. The bypass flow 74 is directed through a nozzle 76 that defines opening at an aft portion of the nacelle 72.

Figure 3:
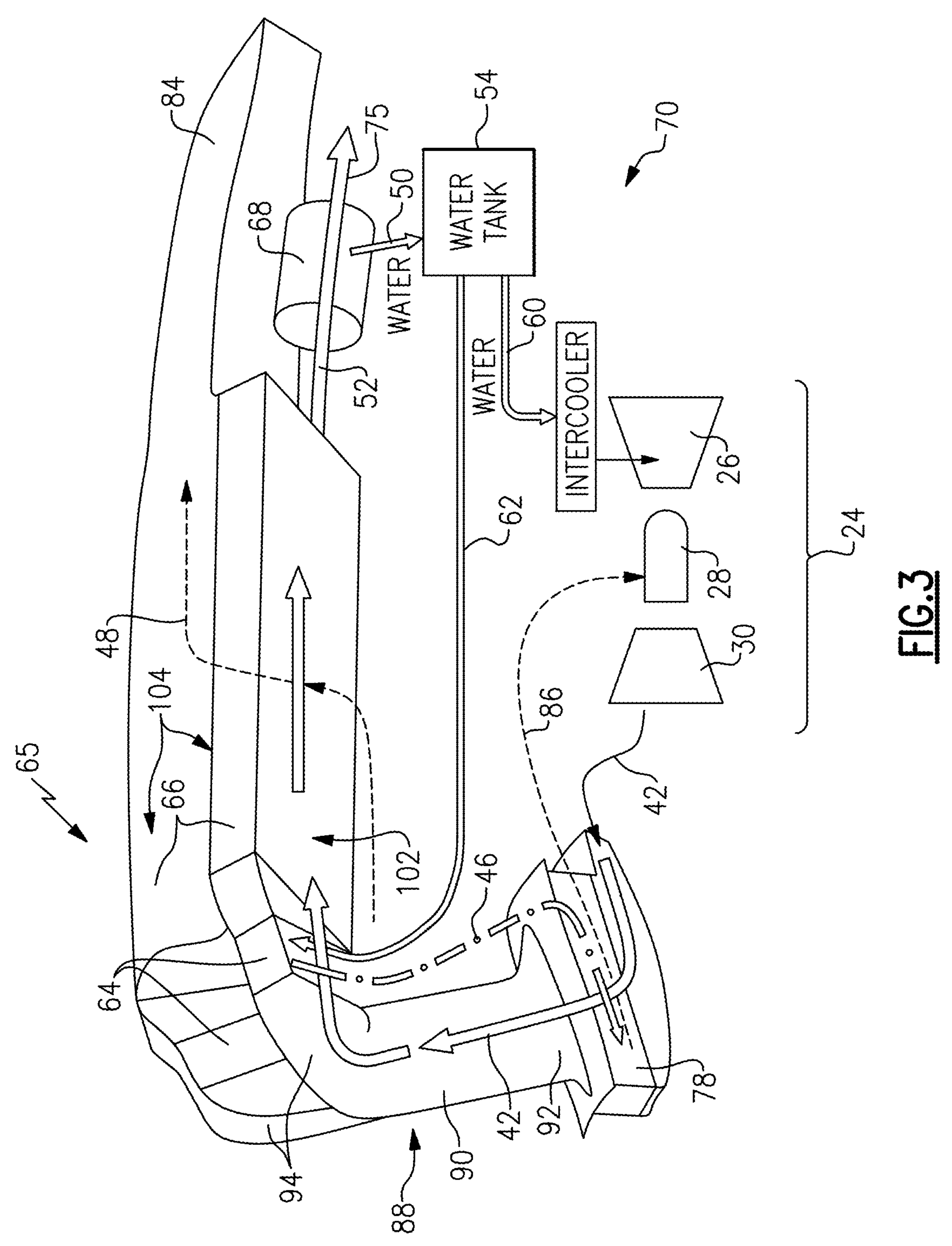
FIG. 3 is a schematic view of an example water recovery system for the aircraft propulsion system.

Referring to FIG. 3 with continued reference to FIGS. 1 and 2, the example condensers 66 are supported by the nacelle 72 and fed an exhaust gas flow 42 emitted from the core engine 24 through the power turbine 32. The exhaust gas flow 42 is routed radially outward through an exhaust duct assembly 88 to a corresponding one of a plurality of evaporators 64.

The exhaust duct assembly 88 includes radially extending struts 90 that extend from a central portion 92. The struts 90 are spaced apart circumferentially about the longitudinal axis A. A splitter 94 splits flow from the strut 90 and turns the flow axially into one of the plurality of evaporators 64. The splitter 94 directs flow through the evaporators 64 and into each condenser 66. In the disclosed example embodiment, the splitter 94 turns the exhaust gas flow 42 axially through the evaporators 64 and separately into each of the condensers 66 of each condenser pair 65.

The central portion 92 of the exhaust duct assembly 88 may include a superheater 78 where additional heat is added to a steam flow 46 generated within the evaporators 64. In one example embodiment, a steam flow 46 from one of the evaporators 64 is communicated to one of a plurality of superheaters 78 disposed in the central portion 92 and closer to the core engine 24. The closer proximity of the superheater 78 to the core engine 24 provides exposure to a higher temperature exhaust gas flow as compared to the temperatures that are present within the radially outwardly located evaporators 64. In the superheater 78, the steam 46 is heated to generate a superheated steam flow 86 that may be communicated to the combustor 28 of the core engine 24.

Accordingly, the flow path for the exhaust gas flow 42 begins in an axially forward direction through a corresponding one of the superheaters 78. The exhaust gas flow 42 is turned radially outward in the central portion 92 of the exhaust duct assembly 88 into a corresponding one of the radial extending struts 90. Exhaust gas flow 42 is therefore directed radially outward in a corresponding one of the struts to the splitter 94.

In the splitter 94, the exhaust gas flow 42 is turned to flow axially rearward through a corresponding one of the evaporators 64 and condensers 66. In the condensers 66, the exhaust gas is cooled to liquify water. A mixed water and gas flow 52 from the condensers 66 are directed to the water separator 68 disposed axially aft of the condensers 66. From the separator, water is communicated to the water tank 54 and the remaining exhaust gases 75 are exhausted through the nozzle 76.

A bypass cooling airflow 48 is communicated to each of the condensers 66. The condensers 66 are arranged in pairs and include inward facing surfaces 104 and outward facing surfaces 102. The cooling airflow 48 is communicated circumferentially relative to the engine axis A from the outward facing surfaces 102 to the inward facing surfaces 104. Cooling airflow 48 exiting the condensers 66 is turned axially and exhausted through the nozzle 76. It should be understood that the cooling airflow 48 may be directed such that it flows from the inward facing sides 104 toward the outward facing sides 102.

Water flow 50 is communicated from the water separator 68 to the water tank 54. From the water tank 54, a pressurized water flow 62 is communicated to each of the evaporators 64. In the evaporators 64, the water is vaporized to generate the steam flow 46. The steam flow 46 may be communicated directly into the core engine 24.

In one example embodiment, the steam flow 46 is communicated to the superheater 78 for further heating to generate the superheated steam flow 86 that is communicated to the core engine 24. In one example, the steam flow 86 is communicated into the combustor 28, however the steam flow may be communicated into any location upstream of the combustor 28 and remain within the contemplation and scope of this disclosure.

Figure 4:
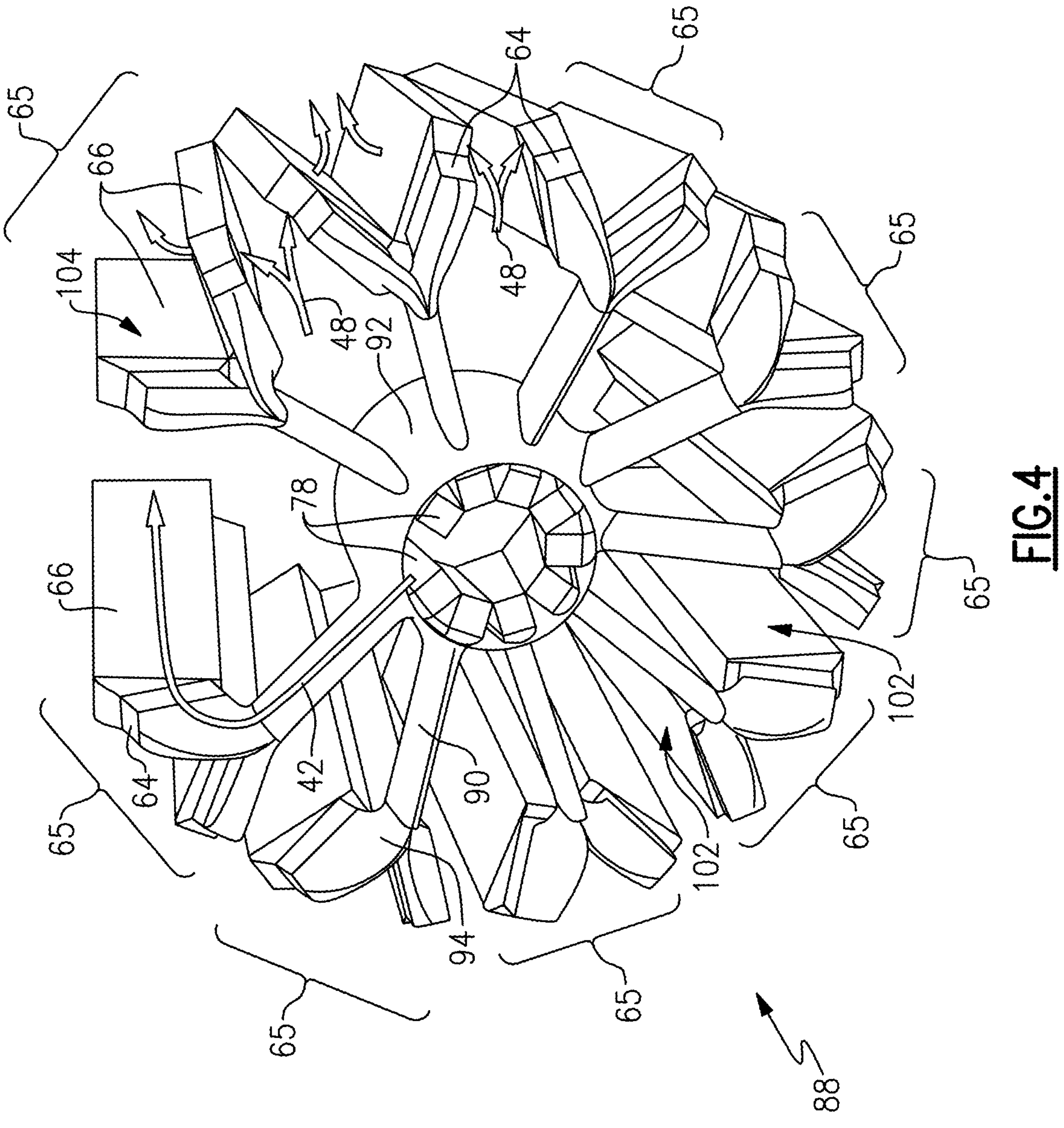
FIG. 4 is a perspective view of an example exhaust duct and condenser arrangement of the water recovery system.

Referring to FIG. 4, with continued reference to FIG. 3, the exhaust duct assembly 88 is shown along with the condensers 66, evaporators 64 and superheaters 78. The exhaust duct assembly 88 directs the exhaust gas flow radially outward to each condenser pair 65. The example exhaust duct assembly 88 includes a corresponding strut 90 for each condenser pair 65. Each condenser pair 65 includes a corresponding pair of evaporators 64 that are arranged at the splitter 94. The center portion 92 is configured to turn the exhaust gas flow 42 radially outward into the corresponding one of the struts 90. The example struts 90 may be a portion of structural support for the core engine 24. The struts 90 may also provide only ducting for directing exhaust gas flow 42.

Figures 5, 6:
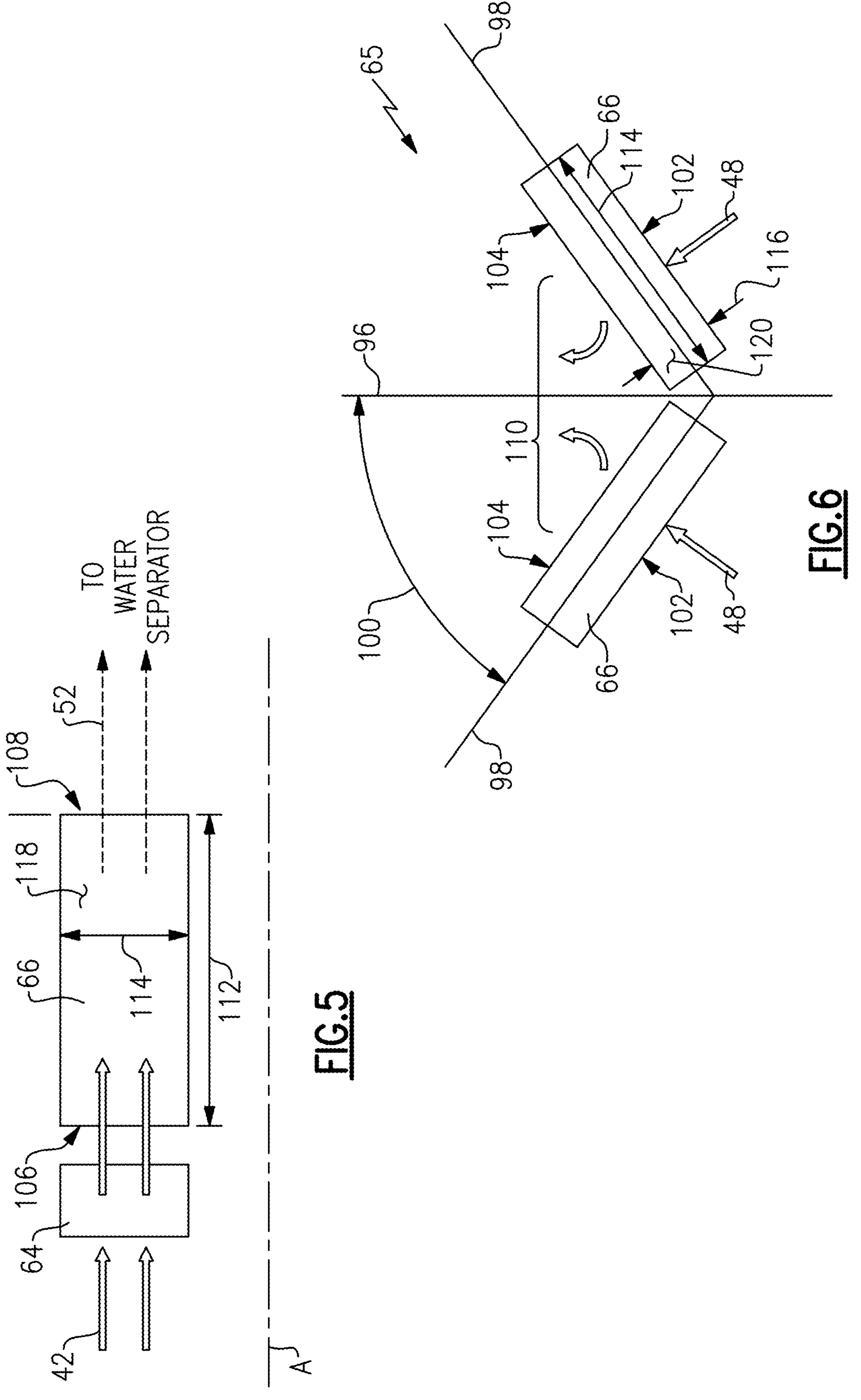
FIG. 5 is an axial schematic view of a portion of an example condenser.
FIG. 6 is a front schematic view of an example condenser pair.

Referring to FIG. 5, with continued reference to FIG. 4, the evaporator 64 and condenser 66 extend axially in series. Once the exhaust gas flow 42 is turned in the splitter 94 (FIG. 4), flow is substantially parallel to the engine longitudinal axis A. Exhaust gas flow 42 from the evaporator 64 flows through a forward face 106 of the condenser 66 and axially toward an aft face 108. A mixed water and gas flow 52 exits through the aft face 108 and is directed to the water separator 68. Although a single water separator 68 is illustrated by way of example, a plurality of water separators 68 may be utilized and may receive the mixed flow 52 from one or several condenser pairs 65.

The condenser 66 extends in a direction substantially parallel to the axis A an axial length 112 and includes a radial height 114 in a direction transverse to the axis A. In one disclosed example, the radial height 114 is less than the axial length 112. The radial height 114 and the axial length 112 define a flow area 118 for the cooling flow 48. The axial length 112 may be adjusted to tailor the cooling flow area 118 without a corresponding increase in radial height 114.

Referring to FIG. 6 with continued reference to FIGS. 4 and 5, each condenser pair 65 is angled relative to each other and a radial plane 96 extending through the strut 90. In one disclosed example embodiment, each of the condensers 66 are aligned along a respective condenser plane 98. The condenser plane 98 is disposed at an angle 100 relative to the radial plane 96 of each strut 90.

The inward facing surface 104 of each condenser 66 faces inward toward the inward facing surface 104 of the other condenser 66 of the condenser pair 65. The outward facing surfaces 102 of each condenser 66 faces away from the other outward facing surface 102 of each condenser pair 65. The cooling airflow 48 is communicated along the outward facing surfaces 102 and flows circumferentially through each condenser 66 into a space 110 between the inward facing surfaces 104. Cooling airflow 48 exhausted through the condensers 66 enters the space 110 between condensers 66 and turns axially aft to be exhausted through the nozzle 76.

The angle 100 may be adjusted to define the space 110 between inward facing surfaces 104 for the exhaust of cooling airflow 48. Moreover, the angle 100 may be tailored to application specific requirements.

The front face 106 includes a width 116 and corresponds with the radial height 114 to define an inlet flow area 120 for the exhaust gas flow 42. The inlet flow area 120 for each condenser 66 in the plurality of condensers 66 combines to provide a total inlet flow area for exhaust gas flow 42.

Accordingly, the disclosed example propulsion system 20 provides and advantageous condenser arrangement to facilitate recovery of water and the generation of steam to improve propulsive efficiency.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An aircraft propulsion system comprising:

a core engine comprising a compressor, combustor, and turbine section, wherein an inlet airflow is compressed communicated to the combustor, mixed with fuel, and ignited to generate an exhaust gas flow that is expanded through the turbine section;

a propulsor driven about a propulsor axis by the core engine;

an exhaust duct assembly comprising a central portion turning an exhaust gas flow radially outward through a plurality of radial struts into a corresponding one of a plurality of splitters configured to turn the exhaust gas flow axially rearward;

a plurality of condenser pairs where water is condensed from the exhaust gas flow received through a corresponding one of the plurality splitters, wherein each of the condenser pairs are angled relative to each other and the corresponding one of the plurality of exhaust ducts and each condenser of the plurality of condenser pairs comprises an inward facing side and an outward facing side through which a cooling air flow is communicated for cooling the exhaust gas flow a plurality of water separators where water from corresponding ones of the plurality of condenser pairs is separated from the exhaust gas flow;

a plurality of evaporators disposed within corresponding one of the plurality of splitters of the exhaust duct assembly; and a plurality of superheaters disposed within the central portion of the exhaust duct assembly.

2. The aircraft propulsion system as recited in claim 1, further comprising a cooling air duct assembly where a portion of inlet airflow is communicated to each of the plurality of condenser pairs and an aft side of each of the plurality of condenser pairs is closed to force the cooling airflow through each of the plurality of condenser pairs.

3. The aircraft propulsion system as recited in claim 2, further comprising a bypass duct where a portion of the inlet airflow is bypassed around the plurality of condenser pairs and the core engine.

4. The aircraft propulsion system as recited in claim 1, wherein the turbine section of the core engine is engine forward of the combustor and the compressor section and an inlet duct assembly communicates a portion of the inlet airflow to an inlet that is disposed aft of the compressor section.

5. The aircraft propulsion system as recited in claim 4, further comprising a power turbine coupled to drive the propulsor, the power turbine disposed engine forward of the core engine.

6. The aircraft propulsion system as recited in claim 5, further comprising a nacelle assembly disposed about the propulsor and the core engine, wherein the plurality of condenser pairs is supported within the nacelle.

7. The aircraft propulsion system as recited in claim 1, comprising an intercooling system where a portion of water recovered from the exhaust gas flow is injected into the compressor for cooling a core flow.

8. A water recovery system for an aircraft propulsion system comprising:

an exhaust duct assembly comprising a central portion turning an exhaust gas flow radially outward through a plurality of radial struts into a corresponding one of a plurality of splitters configured to turn the exhaust gas flow axially rearward;

a plurality of condenser pairs where water is condensed from an exhaust gas flow received through a corresponding one of a plurality of the splitters, wherein each of the condenser pairs are angled relative to each other and the corresponding one of the plurality of exhaust ducts and a cooling airflow is communicated through each condenser into a space between corresponding ones of the condenser pairs;

a plurality of water separators where water from corresponding ones of the plurality of condenser pairs is separated from the exhaust gas flow;

an evaporator where water from the plurality of water separators is transformed into a steam flow and communicated to a combustor, wherein the evaporator comprises a plurality of evaporators disposed within a corresponding one of the plurality of splitters; and a plurality of superheaters where steam flow is further heated.

9. The water recovery system as recited in claim 8, wherein each condenser of the plurality of condenser pairs comprises an outward facing side in flow communication with a cooling air flow and an inward facing side through which the cooling airflow is exhausted.

10. The water recovery system as recited in claim 9, wherein the inward facing side of each of the plurality of condenser pairs face each other.

11. The water recovery system as recited in claim 8, further comprising a nacelle, wherein the plurality of condenser pairs and the plurality of water separators are supported in the nacelle and wherein the nacelle includes a cooling air duct where a portion of inlet airflow is communicated to each of the plurality of condenser pairs for providing a cooling flow through each of the plurality of condenser pairs.

12. The water recovery system as recited in claim 11, wherein the nacelle comprises a bypass duct where a portion of an inlet airflow is bypassed around the plurality of condenser pairs and a core engine.

13. A method of operating an aircraft propulsion system comprising:

generating an exhaust gas flow with a core engine comprising a compressor, combustor, and turbine section;

coupling a propulsor to a power turbine configured to be driven by expansion of the exhaust gas flow about a propulsor axis by the core engine;

communicating the exhaust gas flow through an exhaust duct assembly comprising a central portion turning an exhaust gas flow radially outward through a plurality of radial struts into a corresponding one of a plurality of splitters configured to turn the exhaust gas flow axially rearward;

condensing water in a plurality of condensers pairs wherein each of the condenser pairs are angled relative to each other and a corresponding one of a plurality of splitters and each condenser of the plurality of condenser pairs comprises an outward facing side in flow communication with a cooling air flow and an inward facing side through which the cooling air flow is exhausted;

separating water from the exhaust gas flow in one of a plurality of water separators;

generating a steam flow from water extracted from the exhaust gas flow in an evaporator; and heating the steam flow from the evaporator in a superheater disposed within a corresponding one of the plurality of exhaust ducts.

* * * * *